(12) United States Patent
Nagai et al.

(10) Patent No.: US 9,019,569 B2
(45) Date of Patent: *Apr. 28, 2015

(54) IMAGE READING APPARATUS HAVING MULTIPLE TYPES OF HOLDING UNITS AND CUTTING APPARATUS

(71) Applicant: Brother Kogyo Kabushiki Kaisha, Nagoya-shi (JP)

(72) Inventors: Masahiko Nagai, Nagoya (JP); Masashi Tokura, Konan (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 7 days.

This patent is subject to a terminal disclaimer.

(21) Appl. No.: 13/905,629

(22) Filed: May 30, 2013

(65) Prior Publication Data

US 2013/0321877 A1 Dec. 5, 2013

(30) Foreign Application Priority Data

May 30, 2012 (JP) .................................. 2012-123111

(51) Int. Cl.
| | | |
|---|---|---|
| H04N 1/40 | (2006.01) | |
| H04N 1/00 | (2006.01) | |
| H04N 1/04 | (2006.01) | |
| H04N 1/407 | (2006.01) | |

(52) U.S. Cl.
CPC ....... *H04N 1/00557* (2013.01); *H04N 1/00045* (2013.01); *H04N 1/00679* (2013.01); *H04N 1/00334* (2013.01); *H04N 1/04* (2013.01); *H04N 1/4076* (2013.01); *H04N 2201/0422* (2013.01)

(58) Field of Classification Search
None
See application file for complete search history.

(56) References Cited

U.S. PATENT DOCUMENTS

| | | | | |
|---|---|---|---|---|
| 4,748,516 | A * | 5/1988 | Harano et al. | 358/296 |
| 4,786,100 | A * | 11/1988 | Kleemann et al. | 296/146.6 |
| 5,186,102 | A * | 2/1993 | Kanno et al. | 101/128.4 |
| 5,420,701 | A * | 5/1995 | Terashima et al. | 358/498 |
| 7,831,193 | B2 * | 11/2010 | Minakuchi | 399/391 |
| 8,587,834 | B2 * | 11/2013 | Shimokawa et al. | 358/2.1 |
| 8,614,837 | B2 * | 12/2013 | Yamaguchi | 358/446 |
| 2007/0223062 | A1 * | 9/2007 | Tanaka et al. | 358/497 |
| 2013/0321877 | A1 | 12/2013 | Nagai et al. | |

FOREIGN PATENT DOCUMENTS

| | | |
|---|---|---|
| JP | 62-016949 U | 1/1987 |
| JP | 9-222681 A | 8/1997 |
| JP | 10-051585 A | 2/1998 |
| JP | 10-095544 A | 4/1998 |
| JP | 10-254194 A | 9/1998 |
| JP | 2013-251616 A | 12/2013 |

\* cited by examiner

*Primary Examiner* — Steven Kau
(74) *Attorney, Agent, or Firm* — Fox Rothschild LLP

(57) ABSTRACT

An image reading apparatus including an image reading unit configured to read an image of a workpiece; a plurality of holding members each configured to hold the workpiece while image reading is performed by the image reading unit and each including an indicator identifying a type of holding member; an identification unit configured to identify the type of holding member based on a result of reading of the indicator by the image reading unit; and a correction unit configured to perform a shading correction of the image read by the image reading unit based on a result of identification by the identification unit.

4 Claims, 11 Drawing Sheets

IMAGE READING APPARATUS HAVING MULTIPLE TYPES OF HOLDING UNITS AND CUTTING APPARATUS

CROSS-REFERENCE TO RELATED APPLICATION

This application is based upon and claims the benefit of priority from the prior Japanese Patent Application 2012-123111, filed on, May 30, 2012, the entire contents of which are incorporated herein by reference.

FIELD

The present disclosure relates to an image reading apparatus provided with a holding member for holding a workpiece while the workpiece is being read, and a cutting apparatus provided with the image reading apparatus.

BACKGROUND

Image reading apparatus such as a copier, facsimile, and image scanner are typically provided with a feed mechanism that feeds the object of read or workpiece, typically coming in the form of a sheet material such as a sheet of paper, in the forward and rearward direction. Such image reading apparatuses are further typically provided with a holder for holding the sheet of read object which comprises a holder base and a transparent holder cover. The image of the read object is obtained by reading the surface of the read object with an image scanner while feeding the holder clamping the read object in the forward and rearward direction.

The image scanner is typically configured by components such as a light source, lens, and a plurality of imaging devices. One of the problems encountered in such image scanners is the unevenness in the level of concentration of the read image which may be caused by the variation in the properties of the imaging devices, variation in the brightness of the light source, and the aberration of the lens. Thus, the read image is subjected to a shading correction to correct the concentration level. The shading correction typically involves reading a reference member including, for example, a white reference color with the image scanner prior to the reading of the read object, generating correction data based on the image data of the read reference member, and applying the correction data to correct the concentration level of the read object.

A reference member for shading correction is typically provided on the leading head of the holder being fed into the image reading apparatus. In order to obtain white reference information, the reference member is formed in a white color exhibiting a high level of brightness. By reading the reference member with the image scanner during the image reading, the latest correction data is always available to enable execution of appropriate shading correction.

A cutting apparatus is known that cuts a workpiece made of materials such as paper and cloth in the desired shape. The workpiece is held by a holding member during the cutting operation. By providing an image sensor serving as an image reading unit on such cutting apparatus, information such as the location, size, and the outline of the workpiece held by the holding member may be detected while also enabling reading of the original image of the workpiece for generation of cut data.

The above described application also requires shading correction of the read object in order to obtain a good read image. Thus, a reference member for shading correction, similar to the foregoing may be provided on the holding member. However, the reference member, when provided on the holding member, may be contaminated by the debris resulting from the cutting of the workpiece. Further, scratches resulting from the repeated cutting accumulate on the surface of the holding member. Thus, the holding member is considered as a consumable which is replaced by a new one after being used for approximately ten times. In this respect, the provision of the reference member brings up the cost of the overall system.

SUMMARY

Various exemplary embodiments of the general principles herein may provide an image reading apparatus and a cutting apparatus allowing appropriate shading correction of the image read by an image reading unit.

In one aspect, an image reading apparatus includes an image reading unit configured to read an image of a workpiece; a plurality of holding members each configured to hold the workpiece while image reading is performed by the image reading unit and each including an indicator identifying a type of holding member; an identification unit configured to identify the type of holding member based on a result of reading of the indicator by the image reading unit; and a correction unit configured to perform a shading correction of the image read by the image reading unit based on a result of identification by the identification unit.

In one aspect, an image reading apparatus includes an image reading unit configured to read an image of a workpiece; a plurality of holding members each configured to hold the workpiece while image reading is performed by the image reading unit, the plurality of holding members including at least a first holding member and a second holding member, the first holding member including a holding portion configured to hold the workpiece, the second holding member including a holding portion configured to hold the workpiece and a reference portion configured for use in the shading correction; and a correction unit configured to perform a shading correction of the image read by the image reading unit, the correction unit, when the image reading unit reads the workpiece held by the first holding member, being configured to perform the shading correction based on a preset setting, and when the image reading unit reads the workpiece held by the second holding member and the reference portion, being configured to perform the shading correction based on the image data of the reference portion read by the image reading unit.

In one aspect, a cutting apparatus includes an image reading unit configured to read an image of a workpiece; a plurality of holding members each configured to hold the workpiece while image reading is performed by the image reading unit and each including an indicator identifying a type of holding member, the plurality of holding members including at least a first holding member and a second holding member, the first holding member including a holding portion configured to hold the workpiece, the second holding member including a holding portion configured to hold the workpiece and a reference portion configured for use in the shading correction, and an identification unit configured to identify the type of holding member based on a result of reading of the indicator by the image reading unit; a correction unit configured to perform a shading correction of the image read by the image reading unit based on a result of identification by the identification unit, the correction unit, when the first holding member is identified by the identification unit, being configured to perform the shading correction based on a preset setting, and when the second holding member is identified by the identification unit, being configured to perform the shading correction based on the image data of the reference portion read by the image reading unit; and a cutting mechanism configured to cut the workpiece held by the holding portion of the first holding member.

In one aspect, a cutting apparatus includes an image reading unit configured to read an image of a workpiece; a plurality of holding members each configured to hold the workpiece while image reading is performed by the image reading unit, the plurality of holding members including at least a first holding member and a second holding member, the first holding member including a holding portion configured to hold the workpiece, the second holding member including a holding portion configured to hold the workpiece and a reference portion configured for use in the shading correction; a correction unit configured to perform a shading correction of the image read by the image reading unit, the correction unit, when the image reading unit reads the workpiece held by the first holding member, being configured to perform the shading correction based on a preset setting, and when the image reading unit reads the workpiece held by the second holding member and the reference portion, being configured to perform the shading correction based on the image data of the reference portion read by the image reading unit; and a cutting mechanism configured to cut the workpiece held by the holding portion of the first holding member.

DETAILED DESCRIPTION

Figure 1:
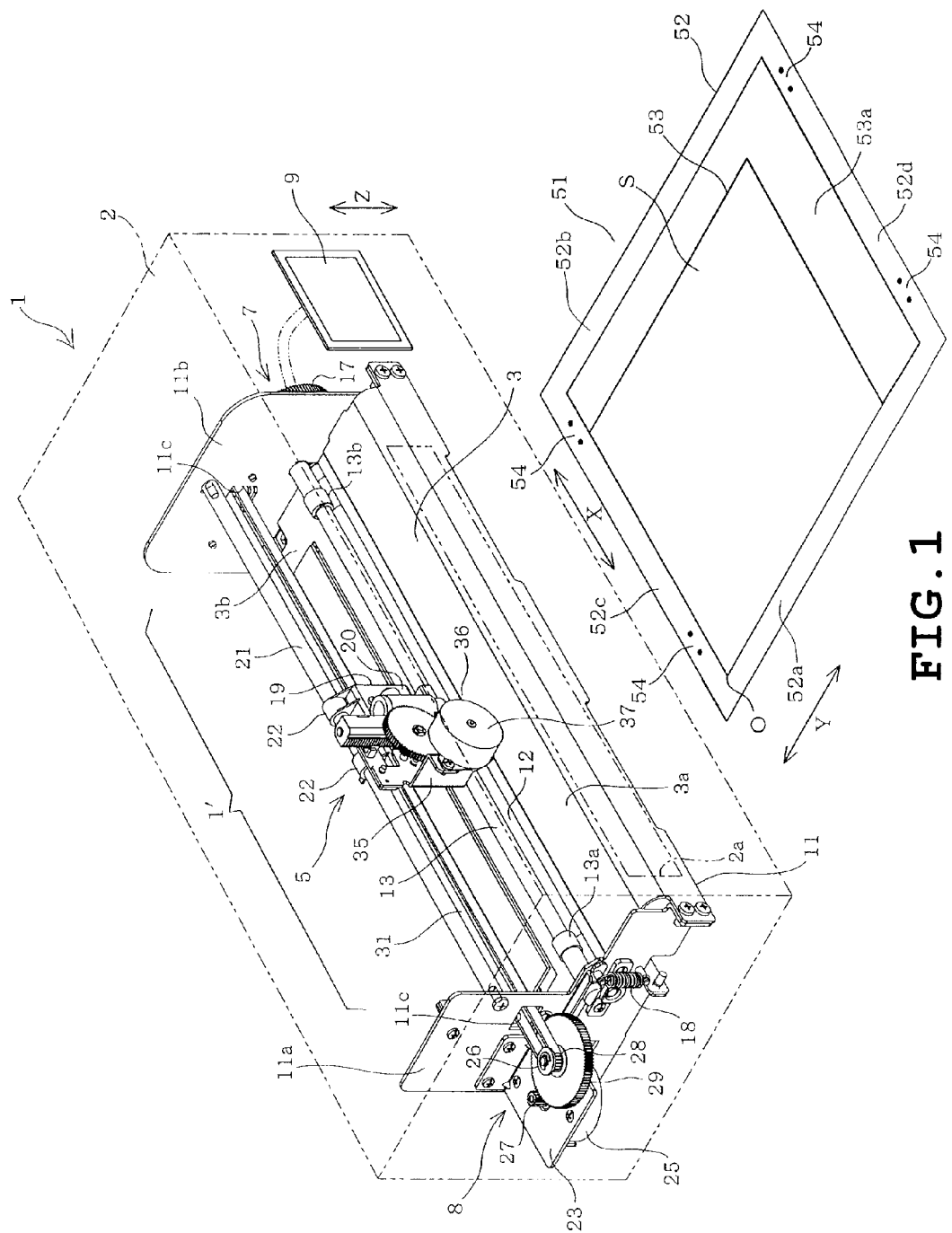
FIG. 1 pertains to a first embodiment and is one example of a perspective view illustrating the inner structure of a cutting apparatus and a cutting-use holding member.

A first embodiment of the disclosure is described with reference to FIGS. 1 to 12. An image reading apparatus 1' of the first embodiment is configured as a component of a cutting apparatus 1 that cuts sheet materials such as a sheet of paper and thus, will be explained through the description of the cutting apparatus 1. Referring to FIG. 1, the cutting apparatus 1 including the image reading apparatus 1' is provided with a main cover 2 shown in FIG. 1, a platen 3 disposed inside the main cover 2, and a cut head 5 provided with a cutter 4 shown in FIGS. 3 and 7 and serving as a cut mechanism. As further shown in FIG. 2, the cutting apparatus 1 is provided with a scanner 6 serving as an image reading unit which will be later described in detail.

Referring back to FIG. 1, the cutting apparatus 1 is provided with multiple types of holding members for holding workpiece S which is subjected to image reading and/or cutting. More specifically, a cut-type or cutting-use holding member 51 also referred to as a first holding member for holding a workpiece S comprising a sheet material such as paper and cloth for example is provided as shown in FIG. 1. As will be later described in detail, the cutting-use holding member 51 is not only used when cutting the workpiece S held by it, but also when the image depicted on the workpiece S is being read.

Figure 9A:
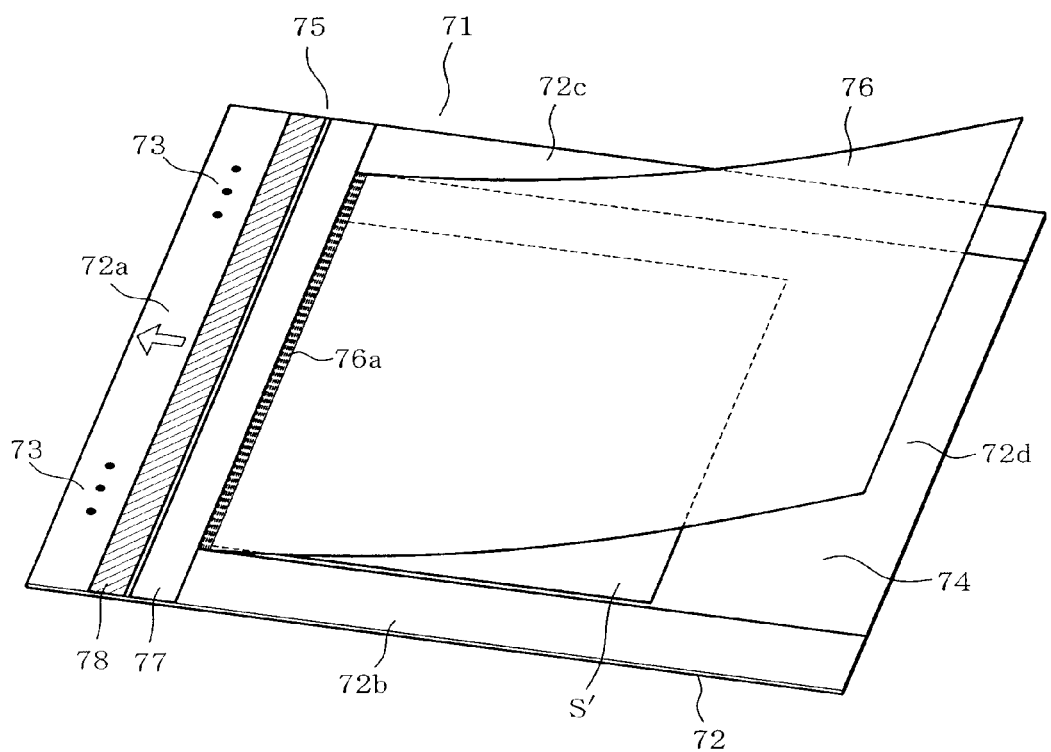
FIG. 9A is one example of a perspective view schematically illustrating the configuration of a reading-use holding member.
Figure 9B:
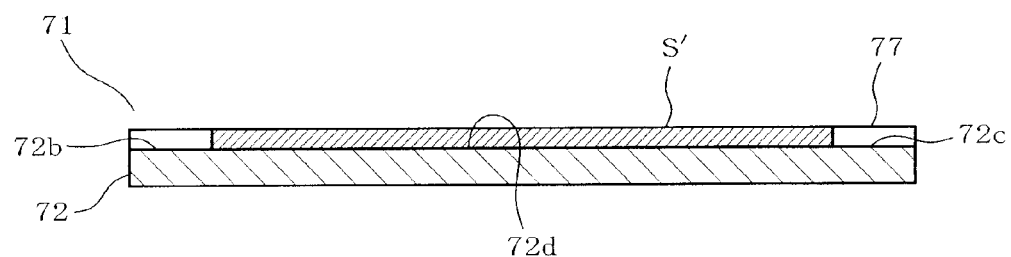
FIG. 9B is one example of a front view of the reading-use holding member.

As further shown in FIGS. 9A, and 9B, the cutting apparatus 1 is also provided with a read-type or reading-use holding member 71 for holding a workpiece S dedicated for reading use comprising a sheet material such as paper and photograph for example. The workpiece S has the original image depicted on it, based upon which, cut data is generated by the cutting apparatus 1. As will be later described in detail, both the cutting-use holding member 51 and the reading-use holding member 71 are generally flat and rectangular. When the cutting-use holding member 51 and the reading-use holding member 71 are collectively referred, they will be represented as "holding member 51/71".

Still referring to FIG. 1, the main cover 2 is shaped like a laterally elongate rectangular box and on the front face of the main cover 2, a laterally elongate opening 2a is formed. Through the opening 2a, the cutting-use holding sheet 51 or the reading-use holding member 71 holding the workpiece S may be placed on the upper surface of the platen 3. The cutting apparatus 1 is further provided with a feed mechanism 7 and a cutter transfer mechanism 8. The feed mechanism 7 feeds the holding member 51/71 in the forward and rearward direction also referred to as the Y direction. The cutter transfer mechanism 8 transfers the cut head 5 in the left and right direction also referred to as the X direction. In the first embodiment, the X and Y directions intersect so as to be orthogonal to one another.

On the right side of the front face of the main cover 2, a display 9 is provided which comprises a full color liquid crystal display. Provided further on the right side of the front face of the main cover 2 is a plurality of control switches 10 only shown in FIG. 10 which is controlled by the user for providing various instructions and making selections and inputs. The control switches 10 include a touch panel provided on the surface of the display 9. Display 9 serves a display unit that presents images of patterns and messages addressed to the user. The user may select a given pattern from those presented on the display 9 and specify various parameters as well as input instructions through the operation of the control switches 10.

Figure 2:
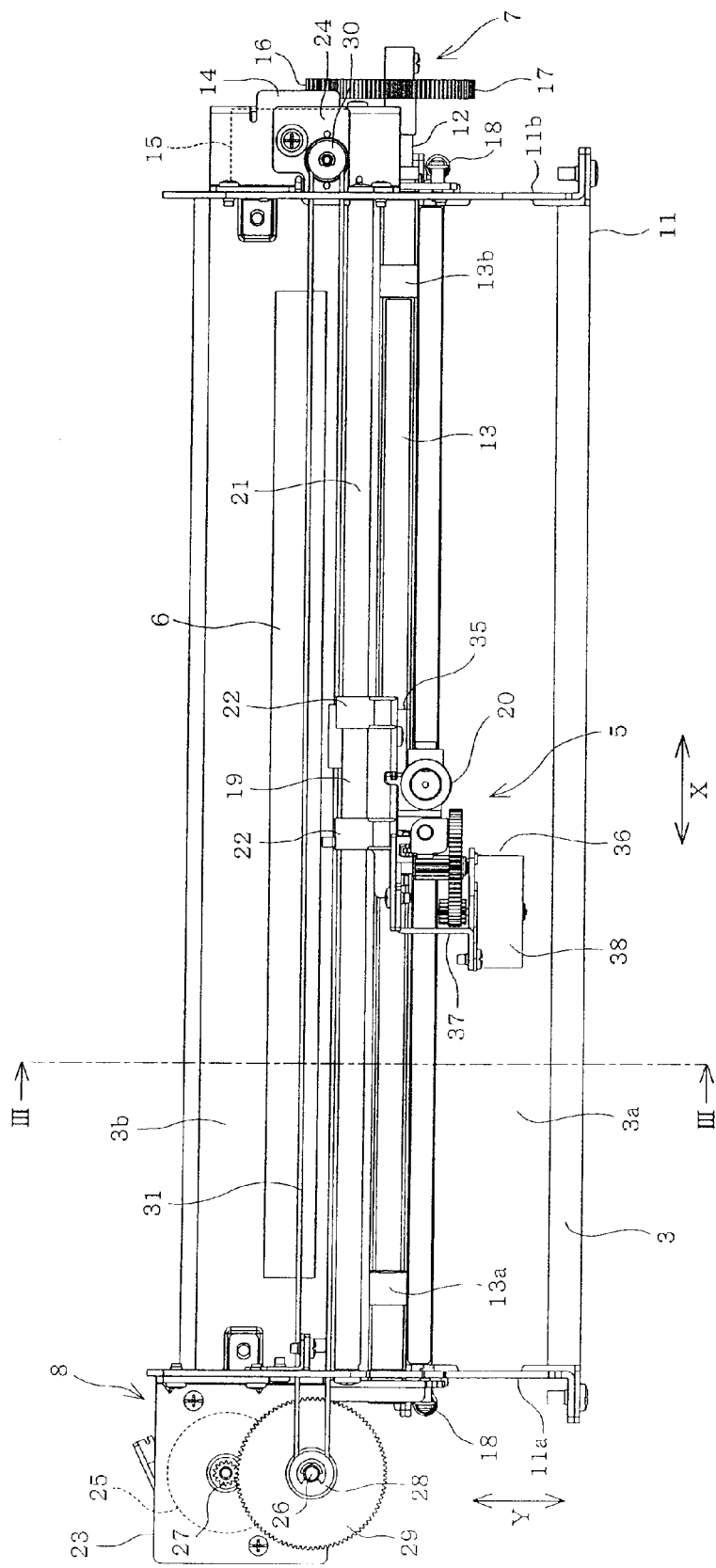
FIG. 2 is one example of a planar view of the internal structure of the cutting apparatus.
Figure 3:
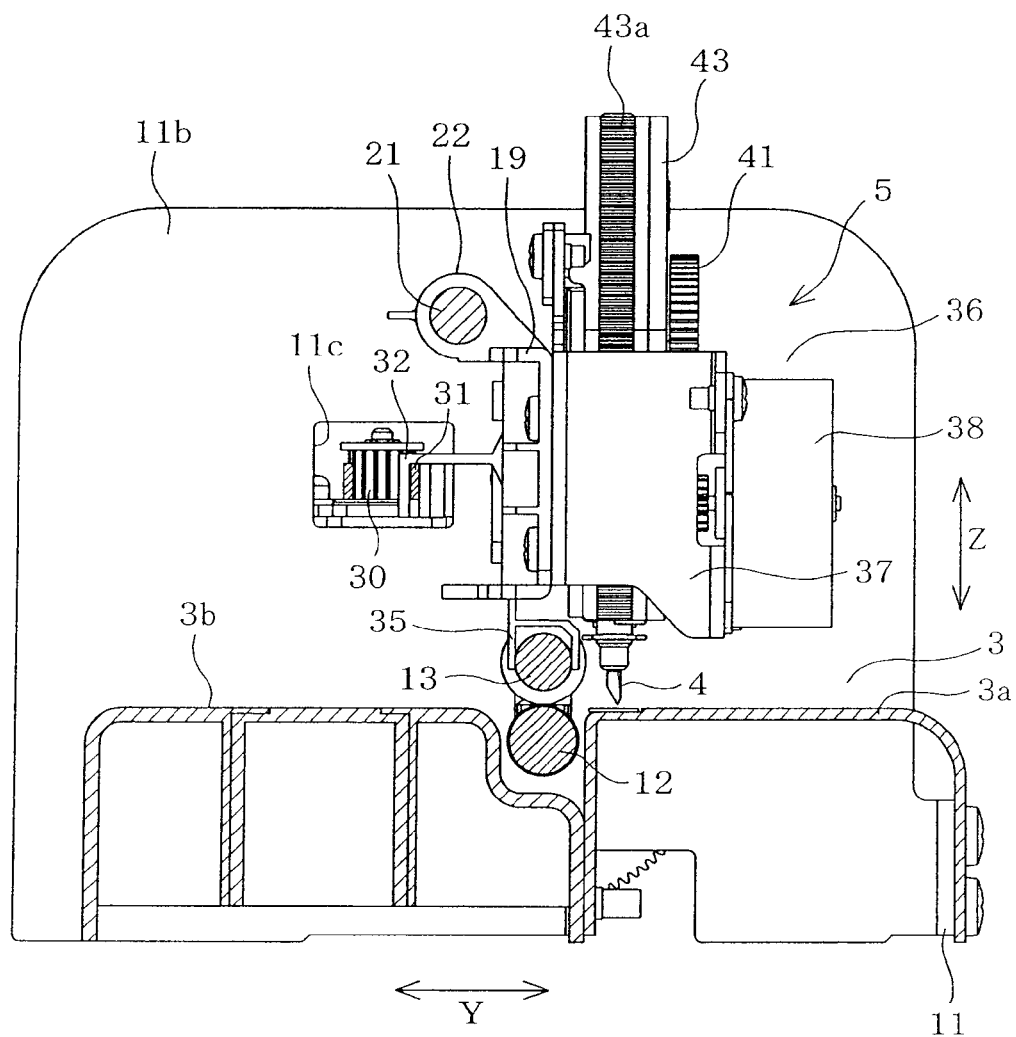
FIG. 3 is one example of a vertical left-side cross sectional view taken along line III-III of FIG. 2.

Referring to FIGS. 2 and 3, the platen 3 receives the underside of the cutting-use holding member 51 when cutting the workpiece S and comprises a pair of front plate 3a and a rear plate 3b being provided on a machine frame 11. The upper surface of the platen 3 is level and the platen 3 is transferred with the cutting-use holding sheet 51 holding the workpiece S or the reading-use holding member 71 holding the workpiece S placed on top of it.

The feed mechanism 7 transfers the holding member 51/71 in the Y-direction across the upper surface of the platen 3 and is configured as described below. Referring to FIGS. 1 and 2, etc, the machine frame 11 is located inside the main cover 2. The machine frame 11 is provided with left and right sidewalls 11a and 11b that are located on the left and right sides of the platen 3 so as to oppose one another. As also shown in FIG. 3, a drive roller 12 and the pinch roller shaft 13 extending across the left and right sidewalls 11a and 11b are provided so as to be located in the clearance between the front plate 3a and the rear plate 3b of the platen 3. The pinch roller shaft 13 and the drive roller 12 are aligned in the up and down direction such that the pinch roller shaft 13 is disposed above the drive roller 12.

The left and right end sides of the drive roller 12 are supported rotatably by the sidewalls 11a and 11b such that the upper end of the drive roller 12 is substantially coplanar with the upper surface of the platen 3. Referring to FIG. 2, the drive roller 12 extends rightward through the right sidewall 11b and on the right end of the drive roller 12, a follower gear 17 is provided which has a relatively large diameter. As further shown in FIG. 2, a mount frame 14 is attached on the outer surface of the right sidewall 11b and a Y-axis motor 15 is mounted on the mount frame 14. The Y-axis motor 15 comprises, for instance, a stepper motor. At end of the rotary shaft of the Y-axis motor 15 a drive gear 16 is attached which has a relatively small diameter. The drive gear 16 is meshed with the aforementioned follower gear 17. Thus, the forward/reverse rotation of the Y-axis motor 15 drives the drive roller 12 in rotation in the forward and reverse directions.

The left and right ends of the pinch roller shaft 13 are supported rotatably by the left and right sidewalls 11a and 11b so as to be slightly movable in the direction of thickness of the workpiece such as workpiece S. The pinch roller shaft 13 extends through both the left and the right sidewalls 11a and 11b, and between the left and right ends of the pinch roller shaft 13 and the outer surfaces of the corresponding sidewalls 11a and 11b, coil springs 18 are engaged to constantly bias the pinch roller shaft 13 downward toward the drive roller 12. Near the left and right side ends of the pinch roller shaft 13 as shown in FIGS. 1 and 2, roller portions 13a and 13b are provided that have outer diameters slightly larger than those of other portions of the pinch roller shaft 13.

Thus, left and right edges 51a and 51b of the cutting-use holding member 51 are held between the drive roller 12 and the roller portions 13a and 13b of the pinch roller shaft 13. The feed mechanism 7 feeds the holding member 51/71 in the Y direction by the rotational drive of the drive roller 12 driven by the Y-axis motor 15 with the left and right edges of the holding member 51/71 held between the drive roller 12 and the roller portions 13a and 13b of the pinch roller shaft 13.

Figure 8:
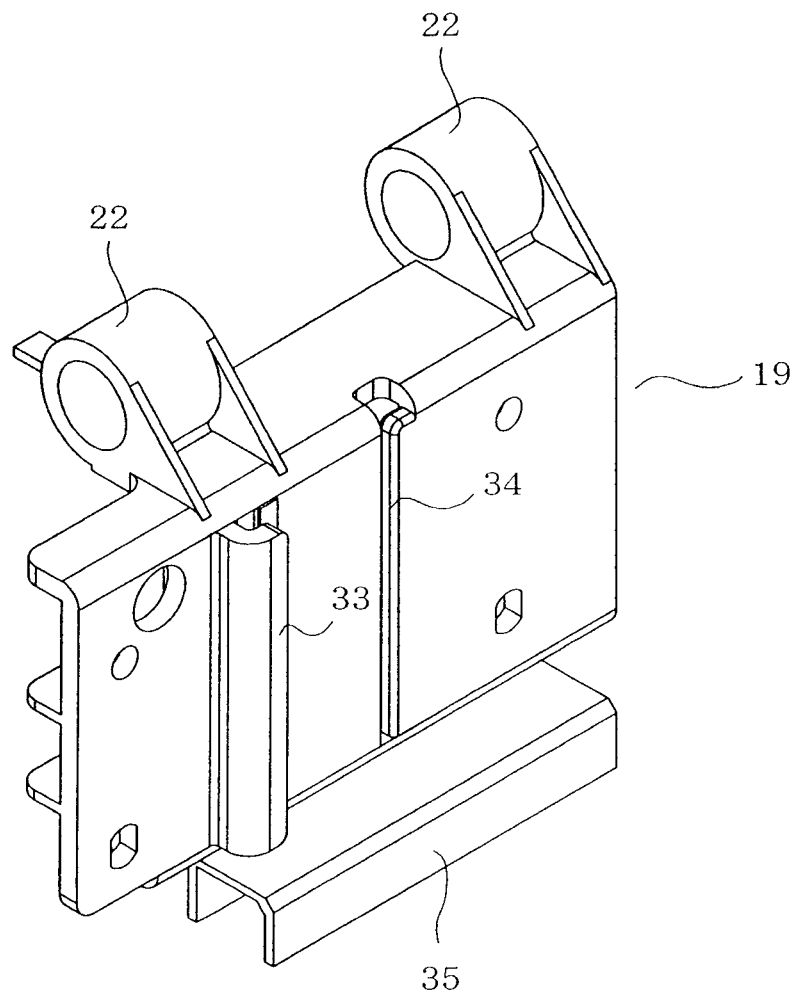
FIG. 8 is one example of a perspective view of a carriage.

The cutter transfer mechanism 8 transfers the carriage 19 and consequently the cut head 5 in the X direction and is configured as described below. Referring to FIGS. 1 to 3, a guide shaft 21 is disposed so as to extend in the left and right direction between the left and right sidewalls 11a and 11b so as to be located slightly behind and above the pinch roller shaft 13. The guide shaft 21 extends substantially parallel with the pinch roller shaft 13, in other words, in the X direction. As shown in FIG. 8, etc., the carriage 19 is provided with a guide sleeve 22 on each of its left and right sides. The guide shaft 21 is passed through the guide sleeves 22 to allow the carriage 19 and consequently the cut head 5 to move in the X direction along the guide shaft 21.

Referring to FIGS. 1 and 2, a horizontal mount plate 23 is attached to the outer rear side portion of the left sidewall 11a, whereas an auxiliary mount plate 24 is attached to the outer side of the right sidewall 11b. On the rear side of the mount plate 23, an X-axis motor 25 comprising a stepper motor for example, is mounted so as to be oriented upward. On the front side of the mount plate 23, a pulley shaft 26 extends rotatably in the direction orthogonal to the mount plate 23. The output shaft of the X-axis motor 25 is provided with a drive gear 27 having a relatively small diameter. The pulley shaft 26 is provided with a timing pulley 28 and a follower gear 29 having relatively large diameter. The timing pulley 28 and the follower gear 29 are structurally integral and thus, rotate integrally. The follower gear 29 meshes with the drive gear 27.

The auxiliary mount plate 24 is provided with timing pulley 30 arranged rotatably with its axis oriented upward. The timing pulley 30 and the timing pulley 28 are wound with an endless timing belt 31 which extends horizontally along the X direction. The intermediate portion of the timing belt 31 is connected to a mount portion 32 provided on the rear surface of the carriage 19 as can be seen in FIG. 3, etc. Sidewalls 11a and 11b are provided with a square opening 11c to allow the timing belt 31 to pass through. The cutter transfer mechanism 8 configured as described above transfers the carriage and consequently the cut head 5 in the left and right direction by the rotation of the X-axis motor 25 in the forward and reverse directions which is transmitted to the timing belt 31 by way of the follower gear 29 and the pulley 28.

The cut head 5 is disposed on the front side of the carriage 19 with a vertical drive mechanism 36 and a cutter holder 20 situated on its left and right sides. The structure of the cut head 5 will be described with reference to FIGS. 3 to 8. Referring to FIGS. 3 and 8, etc., the carriage 19 is configured substantially as a rectangular plate which is laterally elongated in front view. On the upper edge of the carriage 19, the aforementioned guide sleeves 22 are provided so as to be located on the left and right side portions. On the rear side of the carriage 19, the aforementioned mount portion 32 protrudes rearward to be connected to the timing belt 31 as shown in FIG. 3.

Figure 6:
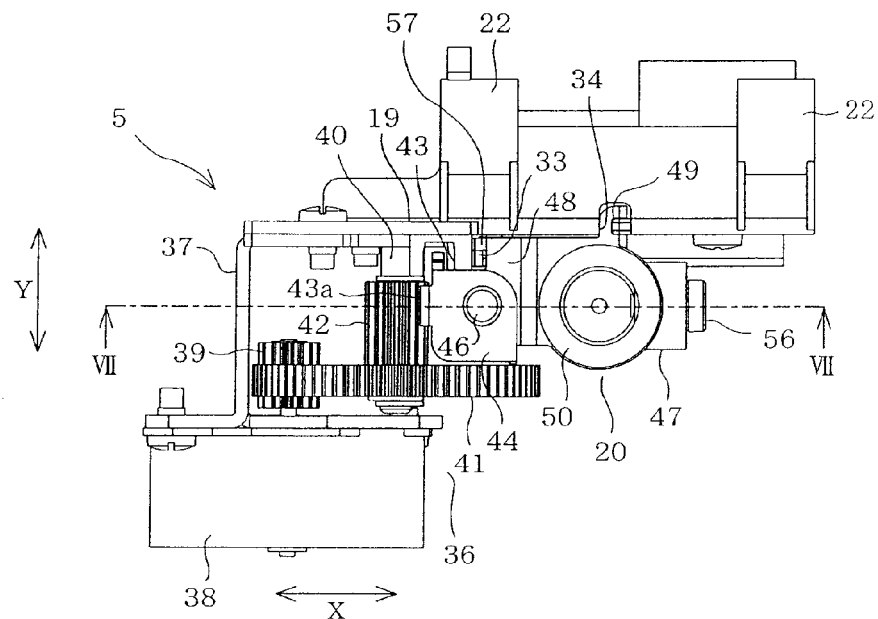
FIG. 6 is one example of a plan view of the cut head.

As shown in FIG. 8, on the portion of the front face of the carriage 19, located slightly to the left, a first engagement portion 33 is provided which extends in the up and down direction. The first engagement portion 33 is L-shaped in plan view. On the central portion of the front face of the carriage 19, a second engagement portion 34 is provided which extends in the up and down direction. Referring to FIG. 6, etc., the first engagement portion 33 and the second engagement portion 34 are engaged with a first engagement subject 57 and a second engagement subject 49 provided on the cutter holder 20 such that the first engagement subject 57 and the second engagement subject 49 are slidable in the Z direction, which in this case, is the up and down direction. Further, on the lower end of the carriage 19, a slide contact portion 35 is provided for maintaining the orientation of the cut head 5, in other words, for inhibiting the pivoting of the carriage 19 about the guide shaft 21.

Referring to FIGS. 3 to 8, the slide contact portion 35 takes a downwardly oriented U-shape in side view. The slide contact portion 35 is made of a thin plate and extends in the left and right direction. As shown in FIG. 3, the inner surface of the slide contact portion 35 establishes sliding contact with the pinch roller shaft 13 provided in the feed mechanism 7 to allow the X-directional movement of the carriage 19 while maintaining its orientation. Because the pinch roller shaft 13 is supported so as to be slightly movable in the up and down direction, in other words, the thickness direction of the workpiece S, the slide contact portion 35 is in sliding contact with the pinch roller shaft 13 so as to be relatively movable in the up and down direction in which the pinch roller shaft 13 is moved. The slide contact portion 35 is formed into a shape that embraces the pinch roller shaft 13 from the front and rear direction which is the direction in which the workpiece S is fed. The slide contact portion 35 moves along the region located between the roller portions 13*a* and 13*b*. The movement of the slide contact portion 35 is arranged so as not to prevent the X-directional movement of the carriage 19, in other words, the cut head 5.

Figure 4:
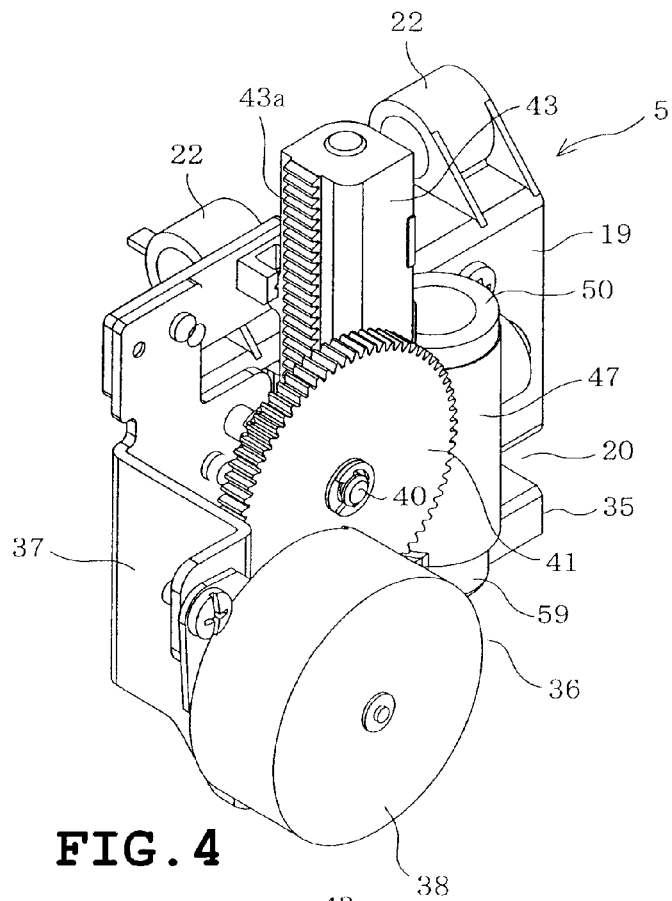
FIG. 4 is one example of a perspective view of a cut head.
Figure 5:
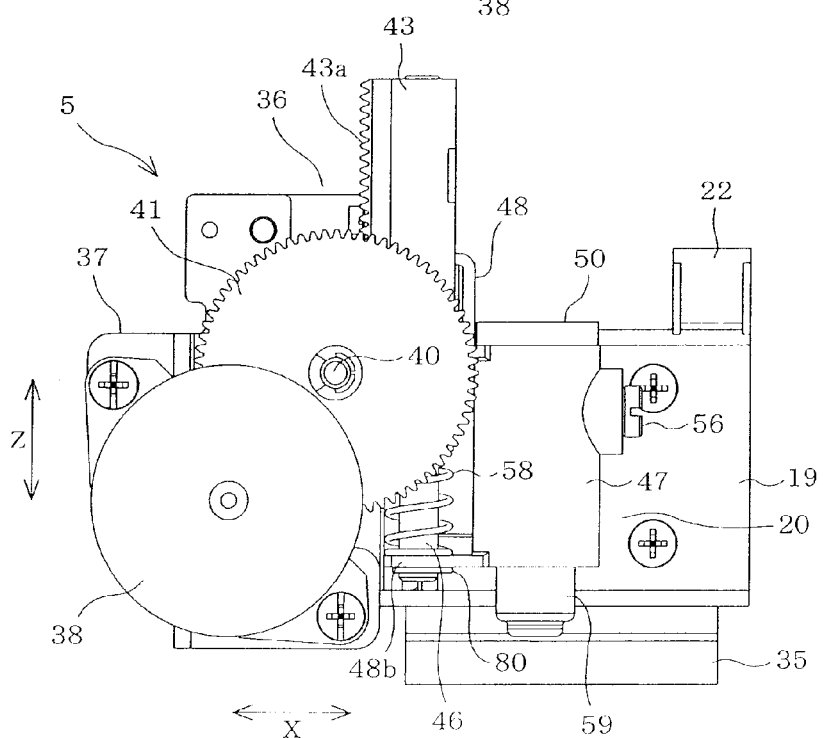
FIG. 5 is one example of a front view of the cut head.

The aforementioned vertical drive mechanism 36 is configured as described in the following. As shown in FIGS. 3 to 7, a mount plate 37 formed, into a crank shape is provided on the left front side of the carriage 19. On the front face of the left end of the mount plate 37, a Z-axis motor 38, comprising a stepper motor for example, is provided so as to be oriented rearward. On the output shaft of the Z-axis motor 34, a drive gear 39 is attached which has a relatively small diameter. As shown in FIGS. 4 to 6, the mount plate 37 is provided with a forwardly protruding gear shaft 40 located rightwardly upward from the Z-axis motor 38. A follower gear 41 having a relatively large diameter and a pinion gear 42 are supported rotatably by the gear shaft 40. The follower gear 41 and the pinion gear 42 are structurally integral and thus, rotate integrally. The follower gear 41 meshes with the drive gear 39.

On the right side of the gear shaft 40, a rack member 43 is provided. The rack member 43 extends in the up and down direction and is shaped such that its left sidewall is adjoined with its front sidewall. The rack member 43 is supported movably in the up and down direction by a later described shaft 46. The left side wall of the rack member 43 has a rack 43*a*, extending in the up and down direction, formed on it. The rack 43*a* meshes with the pinion 42 mentioned earlier. Thus, the rack member 43 is moved in the up and down direction by the rotation of the pinion gear 42 driven by the Z-axis motor 38.

Figure 7:
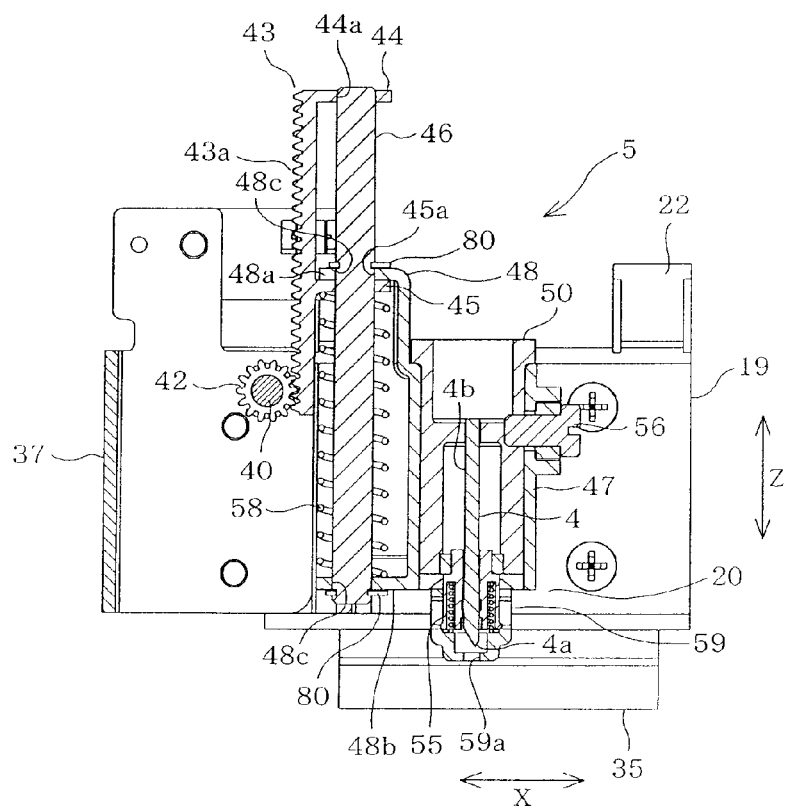
FIG. 7 is one example of a vertical cross sectional front view of the cut head taken along line VII-VII of FIG. 6.

Referring to FIG. 7, on the upper surface of the rack member 43, an upper support piece 44 is provided so as to be structurally integral with the upper surface. The upper support piece 44 is shaped like a thin horizontal plate. On an inner portion of the rack member 43 located slightly below the vertical mid portion, an intermediate support piece 45 is provided. The intermediate support piece 45 is also structurally integral with the rack member 43 and is shaped like a thin horizontal plate. The upper support piece 44 has a through hole 44*a* formed therethrough whereas the intermediate support piece 45 has a through hole 45*a* forced therethrough. Inside the rack member 43, a shaft 46 shaped like a round bar elongated in the up and down direction is disposed so as to extend through the through holes 44*a* and 45*a*.

As shown in FIGS. 4 to 7, the cutter holder 20 includes a mount sleeve 47, a shaft support 48, the first engagement subject 57, and the second engagement subject 49 that are structurally integral. The second engagement subject 49 is only shown in FIG. 6. The mount sleeve 47 extends in the up and down direction and is substantially cylindrical. As will be later described, cutter support sleeve 50 provided with the cutter 4 is removably mounted on the mount sleeve 47. The first engagement subject 57 extends in the up and down direction and is located behind the shaft 46.

The first engagement subject 57 is engaged with the first engagement portion 33 of the carriage 19 so as to be movable in the up and down direction. The second engagement subject 49 is L-shaped in plan view as shown in FIG. 6 and extends in the up and down direction on the rear surface side of the mount sleeve 47. The second engagement subject 49 is engaged with the second engagement portion 34 of the carriage 19 so as to be movable in the up and down direction. Thus, the cutter holder 20 is supported by the carriage 19 so as to be movable in the up and down direction relative to the carriage 19. The cutter holder 20 is moved between the lowered position in which a later described blade 4*a* of the cutter 4 penetrates through the workpiece S and the lifted position in which the blade 4*a* is spaced apart from the workpiece S by a predetermined distance.

The shaft support 48 is located on the left side of the mount sleeve 47 and is provided with an upper plate 48*a* and a lower plate 48*b* as shown in FIG. 7. The upper plate 48*a* and the lower plate 48*b* each has a circular hole 48*c* formed through it. The shaft 46 extends through each of the circular holes 48*c*. The upper plate 48*a* is disposed so as to be placed over the intermediate support piece 45 of the rack member 43. The shaft 46 is mounted, on the shaft support 48 by being locked by stop rings 80 provided on a portion slightly above the vertical mid portion of the shaft 46 and on the lower end portion of the shaft 46. On the outer peripheral portion of the shaft 46, a compression coil spring 58 is wound so as to be located between the underside of the intermediate support piece 45 and the upper surface of the lower plate 48*b*.

Thus, the shaft support 48, in other words, the cutter holder 20 is lifted or lowered with the lifting and lowering of the rack member 43. The cut holder 20 is thus, moved between the lowered position in which the blade 4*a* of the cutter 4 penetrates through the workpiece S and the lifted position in which the blade 4*a* is spaced apart from the workpiece S by a predetermined distance.

The lowering of the cutter holder 20 will be described in detail hereinafter. The cutter holder 20 is gradually lowered with the lowering of the rack member 43. The cut holder 20 stops its descent at the location where the blade 4*a* of the cutter 4 penetrates through the workpiece S, whereas the rack member 43 continues its descent. The rack member 43 stops its descent after descending for a predetermined distance. Thus, in the lowered position of the cutter holder 20, the compression coil spring 58 is compressed by a predetermined distance below the intermediate support piece 45. As a result, the biasing force, i.e. the elasticity of the compression coil spring 58 exerts a predetermined pressure on the workpiece S applied through the cutter 4. The upward movement of the cutter holder 5 and consequently the cutter 4 against the biasing force of the compression coil spring 58 is also permitted.

As shown in FIG. 7, the cutter support sleeve 50 exhibits a cylindrical shape elongated in the up and down direction. The outer peripheral surface of the cutter support sleeve 50 is fitted with the inner peripheral portion of the mount sleeve 47. The cutter 4 is mounted into the cutter support sleeve 50 so as to extend along the central axis of the cutter support sleeve 50. The lower end of the cutter 4 terminates into a blade 4*a* which protrudes downward from the lower end of the cutter support sleeve 50. On the lower portion of the cutter support sleeve 50, a presser portion 59 is provided movably in the up and down direction so as to surround the blade 4*a*. Between the presser portion 59 and the cutter support sleeve 50, a coil spring 55 only shown in FIG. 7 is disposed which constantly biases the presser portion 59 downward. A hole 59*a* is defined through the central portion of the bottom surface of the presser portion 59 which allows the blade 4*a* of the cutter 4 to pass through.

The cutter support sleeve 50 is fitted into the mount sleeve 47 from the upward direction and fastened by a screw 56. Thus, the cutter 4, being supported by the cutter holder 20, in other words, the cutter support sleeve 50 is moved up and down by the vertical drive mechanism 36. When the cutting operation is not ongoing, the cutter 4 is located in the lifted position shown in FIGS. 5 and 7 in which the blade 4*a* is not exposed from the presser portion 59.

When the cutter holder, i.e. the cutter support sleeve 50 is lowered by the vertical drive mechanism 36, the under side of the presser portion 59 contacts the upper surface of the workpiece S to disallow further descent. Then, the cutter holder 20 and consequently the cutter 4 is further lowered against the spring force of the coil spring 55 to the lowered position in which the blade 4a passes through hole 59a of the presser portion 59 to penetrate through or cut the workpiece S. Under such state, the cutting-use holding member 51 is fed in the Y direction by the feed mechanism 7 while transferring the cut head 5 in the X direction to execute the cutting operation for cutting the workpiece S.

In the first embodiment, the cutting apparatus 1 including the image reading apparatus 1' is provided with a scanner 6 as shown in FIG. 2. The scanner 6 serves as an image reading unit for reading the images of workpieces S. The scanner 6 may comprise a CIS (contact image sensor). Though not shown in detail, the scanner 6 comprises components such as a line sensor configured by multiple imaging devices aligned in the X direction, a light source such as a lamp, and a lens. The scanner 6 is located behind the guide shaft 21 and extends in the X direction so as to be substantially equal in length to the width of the cutting-use holding member 51 and the later described reading-use holding member 71.

Figure 10:
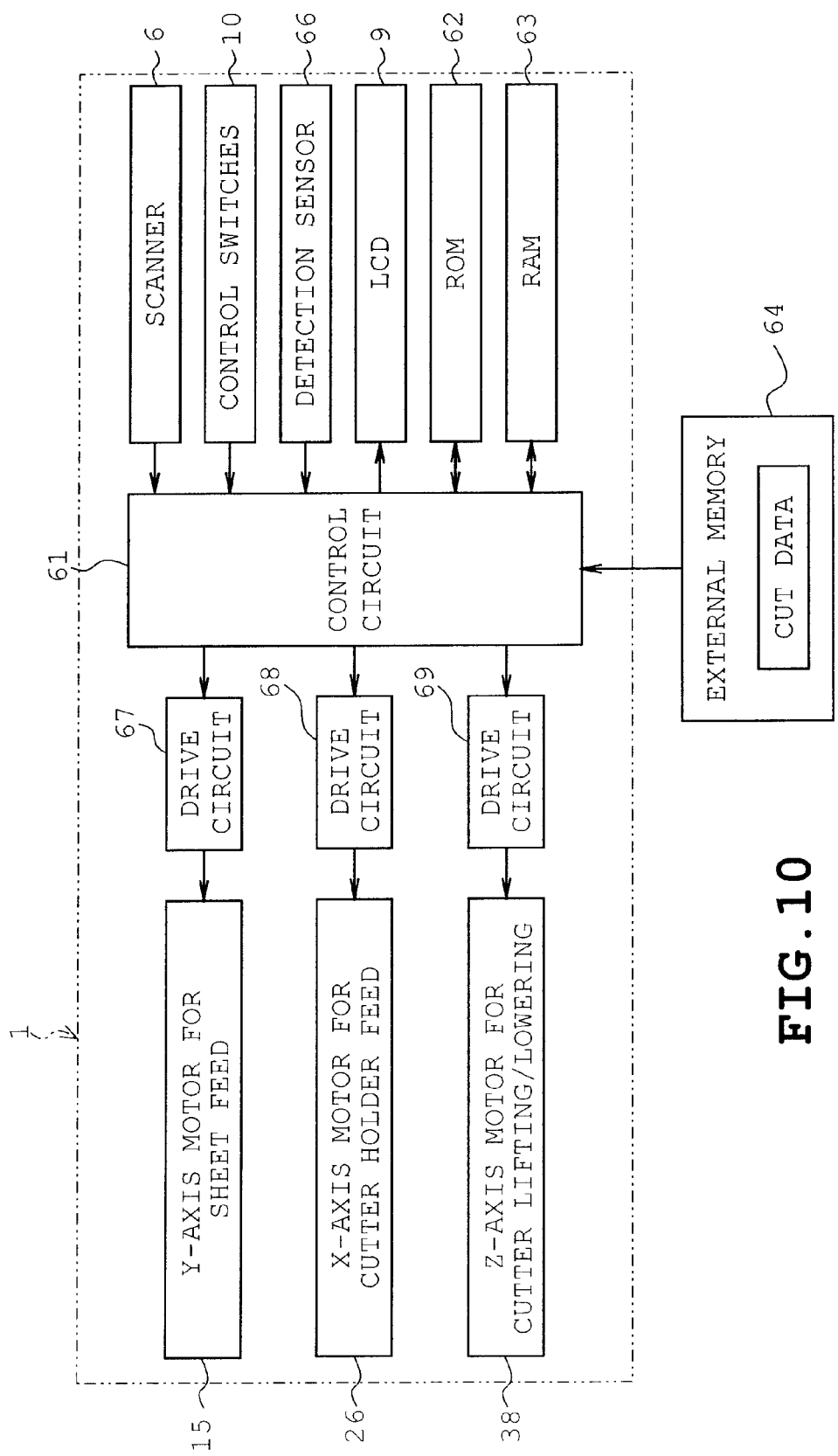
FIG. 10 is one example of a block diagram schematically illustrating an electric configuration.

The scanner 6 faces downward and is provided with a read head on its underside which is equipped with a contact glass. The scanner 6 reads the images on the workpiece placed on the platen 3 by positioning the read head in the proximity of the upper surface of the workpiece. More specifically, the scanner 6 reads the image of the workpiece S held by the cutting-use holding member 51 and detects the location and size of the workpiece S in order to output the same on the display 9. The scanner 6 also reads the image of the workpiece S held by the later described reading-use holding member 71 and reads the image of the workpiece S based upon which the cut data is generated. Further, as will be later described, the images of indicators 54 and 73 of the holding member 51/71 are read in order to determine the type of the holding member. The scanner 6 is controlled by a control circuit 61 as shown in FIG. 10.

Next, a description will be given on the cutting-use holding member 51 and the reading-use holding member 71. As shown in FIG. 1, the cutting-use holding member 51 also referred to as the first holding member is made of a soft synthetic resin material and includes a base 52 and a holding portion 53 provided over the base 52. The base 52 is rectangular and is slightly elongated in the front and rear direction. The holding portion 53 includes an adhesive layer 53a on a rectangular area on the upper surface of the base 52 surrounded by a left edge 52a, a right edge 52b, front edge 52c, and a rear edge 52d. The adhesive layer is referred to as a second adhesive layer 53a and the adhesive force of the second adhesive layer 53a is referred to as a second adhesive force. Attachment of the workpiece S on the second adhesive layer 53a establishes the hold of the workpiece S. The second adhesive force of the second adhesive layer 53a is controlled to a level to establish an unmovable and reliable hold of the workpiece S during the cutting operation while allowing a relatively easy peel of the workpiece S after the cutting operation is completed.

On the front and rear edges 52c and 52d located on the upper surface of the cutting-use holding member 51, indicator 54 is provided to represent the type of holding member. The indicator 54 provided on the cutting-use holding member 51 comprises a couple of black dots aligned in the left and right direction. Indicator 54 is provided on the left and right end portions of each of the front and rear edges 52c and 52d of the cutting-use holding member 51, meaning that there are a total of 4 indicators provided on the cutting-use holding member 51. As will be later described, the indicator 54 allows the control circuit 61 to distinguish the type of holding member by reading the upper surface of the edge 52c or 52d with the scanner 6. The cutting-use holding member 51 may be turned around to reverse the forward and the rearward direction, meaning that the cutting-use holding member 51 may be inserted into the inlet 2a from the rear edge 52d.

The cutting-use holding member 51 is assigned an X-Y coordinate system in which the origin O is located, for example, on the left corner of the holding portion 53. The X-Y coordinate system serves as the basis for controlling the later described cutting operation. Further, scratches resulting from the repeated cutting gradually accumulate on the surface of the cutting-use holding member 51. Further, repeated attachment and detachment of workpiece S gradually reduces the adhesive force of the second adhesive layer 53a. Thus, the cutting-use holding member 51 is considered as a consumable which is replaced by a new one after being used for approximately ten times.

In contrast, the reading-use holding member 71 of the first embodiment is configured as shown in FIGS. 9A and 9B. As shown in FIG. 9A, the reading-use holding member 71 is made of a soft synthetic resin material and includes a rectangular base 72 slightly elongated in the front and rear direction. The width of the base 72 taken along the left and right direction is substantially the same as the width of the base 52 of cutting-use holding member 51. Provided on the base 72 is an indicator 73, a holding portion 74, and a reference portion 75. The indicator 73 identifies the type of holding member. The holding portion 74 holds workpiece S comprising a sheet material such as paper and having the original image for generating the cut data depicted on it. The reference portion 75 is used in the later described shading correction.

The holding portion 74 includes a placement region 72b on a rectangular area on the upper surface of the base 72 surrounded by front end portion 72a which is the leading end in the forward feed, a left end portion 72b, and a right end portion 72c. The placement region 72b is provided with a transparent sheet 76. The transparent sheet 76 is provided over the workpiece S placed on the upper surface of the base 72. Thus, the workpiece S is held between the transparent sheet 76 and the base 72. The transparent sheet 76 is made of a soft and highly transparent rectangular sheet made of synthetic resin. The front edge of the transparent sheet 76 is bonded on the base 72. FIG. 9A shows a bonding portion 76a in a dotted line. The rear edge of the transparent sheet 76 may be lifted away from the base 72 in an opened state and be rested on the placement region 72d located on the upper surface of the base 72 in a closed state.

The user may establish the hold of the workpiece S by lifting open the transparent sheet 76 and placing the workpiece S on the placement region 72d, whereafter the transparent sheet 76 is lowered to its original position so as to be placed over the workpiece S. According to the above described configuration, the workpiece S is held reliably and unremovably while allowing the workpiece S to be easily removed after the workpiece S is read. The image depicted on the upper surface of the workpiece S can be read through the transparent sheet 76. The reading-use holding member 71 is also assigned an X-Y coordinate system in which the origin O is located, for example, on the left corner of the placement region 72d.

The indicator 73 provided on the reading-use holding member 71 comprises 3 black dots aligned in the left and right direction. Indicator 73 is provided on the left and right and portions of the front edge 72a of the base 72, meaning there is a total of 2 indicators provided on the base 72. The indicator 73 allows the later described control circuit 61 to distinguish or identify the type of holding member by reading the upper surface of the front edge 72a with the scanner 6.

The reference portion 75 is provided on the portion of the upper surface of the base 72 located between the region in which the indicator is provided and the holding portion 74. In the first embodiment, the reference portion 75 includes both a white reference portion 77 for correcting the white level of the read image and a black reference portion 78 for correcting the black level of the read image. In FIG. 9A, the black reference portion 78 is hatched for distinction.

The white reference portion 77 comprises a tape having a predetermined width which is colored in white reference color and is applied laterally across the portion of the base 72 located reward relative to the front edge 72a. Similarly, the black reference portion 78 comprises a tape having a predetermined width which is colored in black reference color and is applied laterally across the portion of the base 72 located forward relative to the front edge 72a.

The height of the upper surfaces of the white reference portion 77 and black reference portion 78 are configured to be higher than the height of the upper surface of the placement 72d located on the base 72 as shown in FIG. 9B. The difference between the heights is configured to be substantially equal to the standard thickness of workpiece S being approximately 0.28 mm which envisages the thickness of a printed photograph. Stated differently, the upper surface of the reference portion 75 is configured to be substantially level with the upper surface of workpiece S held by the holding portion 74. FIG. 9B does not show the transparent sheet 76 for ease of explanation.

Next, a control system of the cutting apparatus 1 as well as the image reading apparatus 1' will be described with reference to FIG. 10. The control circuit 61 serving as a control unit responsible for the overall control of the cutting apparatus 1 is primarily configured by a computer (CPU) and is coupled to a ROM 62, RAM 63, and external memory 64. ROM 62 stores computer programs such as a cut control program for controlling the cutting operation and a display control program for controlling the image output through display 9. The RAM 63 is a temporary storage for storing data and programs required in executing various processes.

The control circuit 61 receives inputs of signals such as signals of images read from the scanner 6 and control signals from various control switches 10. The control circuit 61 further receives inputs of signals from the detection sensor 66 that detects the leading end of the holding member 51/71 inserted through the inlet 2a. The external memory 64 stores cut data for cutting multiple types of patterns. The cut data includes basic size information, cut line data, and display data. The basic size information represents the longitudinal and latitudinal sizes of the pattern and is a shape data corresponding to the shape of the pattern. The cut line data comprises coordinate data indicating the vertexes of line segments of the cut line data in X-Y coordinate system which is defined by the cutting apparatus 1.

The control circuit 61 is further connected to the display 9. The display 9 outputs various items such as a mode selection screen, a pattern selection screen, and a layout selection screen. The user may select a desired functional mode and a pattern or specify where to make the cuts through the operation of various control switches 10, while viewing the display 9. The control circuit 61 is further connected to drive circuits 67, 68, and 69 for driving the Y-axis motor 15, the X-axis motor 25, and the Z-axis motor 38. The control circuit 61 controls components such as the Y-axis motor 15, the X-axis motor 25, and the Z-axis motor 38 through the execution of the cut control program to automatically execute the cutting of the workpiece S located on the cutting-use holding member 51.

The control circuit 61, when cutting out a pattern from the cutting-use workpiece S, feeds the cutting-use holding member 51 and consequently the workpiece S held by it in the Y direction by the feed mechanism 7 based on the cut data, in other words, the cut line data of a given pattern. By moving the cutter holder 20, in other words, the cutter 4 in the X direction by the cutter transfer mechanism 8 with the feed movement, the workpiece S is cut along the outline of the pattern.

In reading images with the scanner 6, the controller 61 feeds the holding members 51/71 holding the workpiece S to be scanned in the Y direction toward the rear side of the platen 3 by the feed mechanism 7. The scanning or reading by the scanner 6 is performed in synchronism with the feeding to obtain images of the workpiece S. The control circuit 61 extracts information such as the outline and the graphic shapes of the pattern from the images read by the scanner 6 by known image processing methods. The aforementioned shading correction is carried out during the image processing. The shading correction corrects the unevenness in the level of concentration of the read image by using the correction data.

In the first embodiment, the control circuit 61 executes the following processes through its software configuration as will be explained in the following description on the working of the embodiment and the flowchart and is one example of an identification unit and a correction unit. The control circuit 61, when detecting the insertion of either of the holding member 51 and 71 by the detection sensor 66, executes the image reading of the indicators 54 and 73 of the holding member 51/71 through the scanner 6. Then, the type of the inserted holding member 51/71 is determined by identifying the type of indicators 54 and 73.

In case the inserted holding member is identified as the cutting-use holding member 51, the control circuit 61 proceeds to read the images depicted on the surface of the cutting-use holding member 51 with the scanner 6. This image reading process detects the location and the size of the workpiece S held by the cutting-use holding member 51 which serves as the basis for making an output on the display and determining the location for executing the cutting operation. During the image processing, a pre-stored or the default correction data stored in the ROM 62 for example is used to execute the shading correction of the read image. Thereafter, a cutting operation as such described above is carried out.

In contrast, in case the inserted holding member is identified as the reading-use holding member 71, the control circuit 61 proceeds to read the image of the reference portion 75 provided on the reading-use holding member 71 with the scanner 6. Then, shading correction data is specified based on the read image. At this instance, both the black level correction data based on the read black reference portion 78 and the white level correction data based on the read white reference portion 77 is acquired. Then, the images depicted on the workpiece S of the cutting-use holding member 51 is read with the scanner 6. During the image processing, shading correction is executed on the read image using the correction data specified by reading the reference portion 75. Thereafter, processes such as the generation of the out data based on the read image are carried out.

Figure 11:
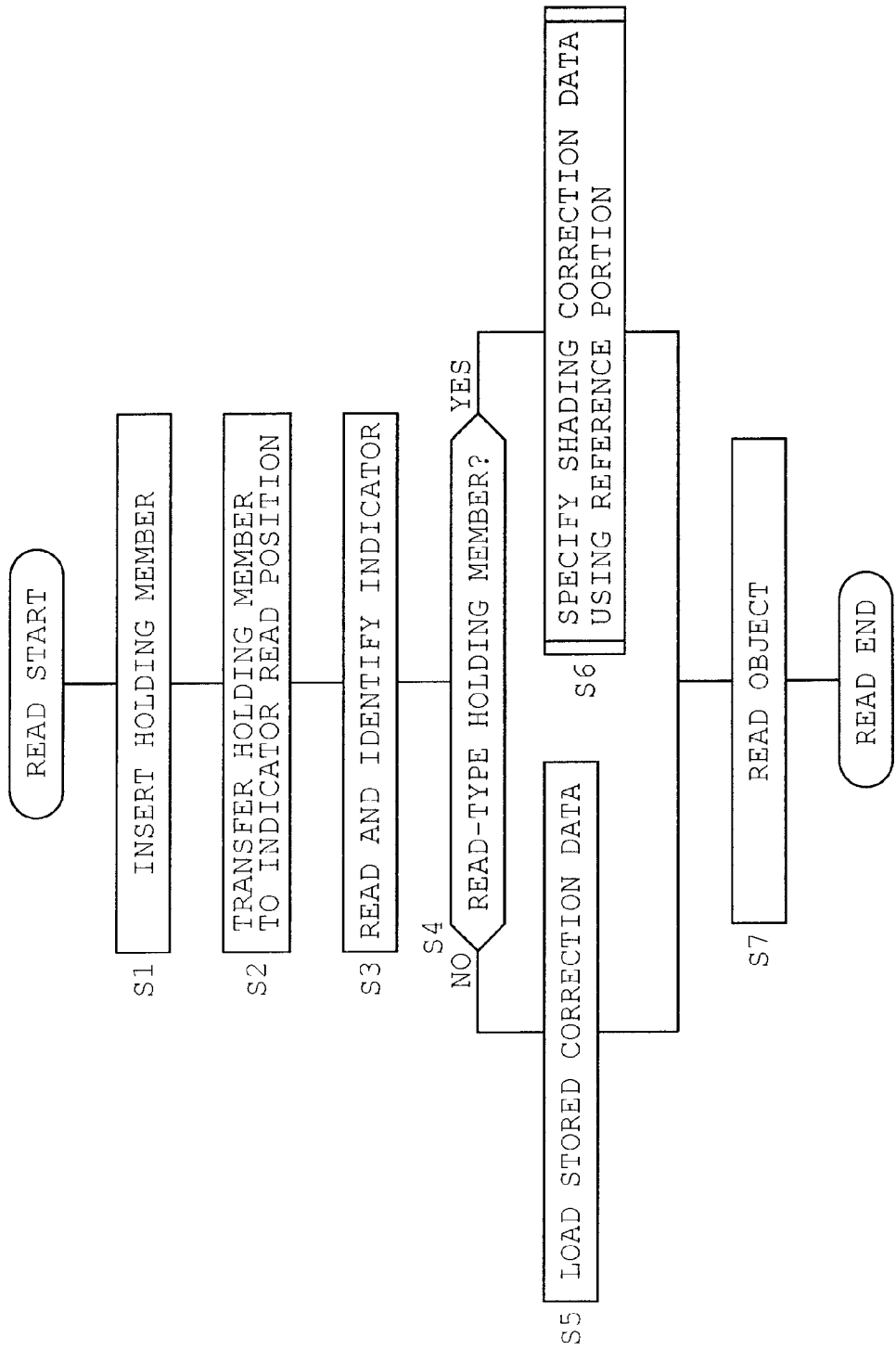
FIG. 11 is a flowchart indicating one example of a schematic process flow of a reading process executed by a control circuit.

Next, the working of the above described structure and configuration will be described with reference to FIGS. 11 and 12. The flowchart in FIG. 11 schematically indicates the process flow of an image reading process executed by the control circuit 61 when the holding member 51/71 is inserted through the inlet 2a of the cutting apparatus 1. The flowchart of FIG. 12 elaborates on the step S6 indicated in FIG. 11 which is a process for specifying the shading correction data.

In case the user wishes to cut the workpiece S with the cutting apparatus 1, the workpiece S is attached to and thus, held by the second adhesive layer 53a provided on the holding portion 53 of the cutting-use holding member 51 as shown in FIG. 1. Then, the front end of the cutting-use holding member 51 is inserted into inlet 2a. In case the user wishes to read the original image depicted on the reading-use workpiece S for cut data generation, for example, the workpiece S is held by the reading-use holding member 71. The hold is established by lifting the transparent sheet 76 of the reading-use holding member 71 and placing the workpiece S on the placement region 72d, whereafter the transparent sheet 76 is lowered to its original position so as to be placed over the workpiece S. Then, the front end of the reading-use holding member 71 is inserted into the inlet 2a.

In response to the insertion of the holding member 51/71 into the inlet 2a, the control circuit 61 starts the reading process indicated in the flowchart of FIG. 11. At step S1, the insertion, of the holding member 51/71 is detected by the detection sensor 66. Then, at step S2, the holding member 51/71 is fed by the feed mechanism 7 until the leading end of the holding member 51/71 where the indicators 54 and 73 are provided is located immediately below the scanner 6. At step S3, image reading of the indicators 54 and 73 is performed and the type of the holding member 51/71 is identified by the evaluation on the type of the indicators 54 and 73.

At step S4, a judgment is made as to whether or not the inserted or set holding member is the reading-use holding member 71. If the set holding member is the cutting-use holding member 51 and not the reading-use holding member 71 (step S4: No), the preset and pre-stored default correction data is read out in step S5. Then, at step S7, the image of the workpiece S is read. The shading correction of the read image is performed based on the above described preset shading correction data. Though not shown, processes such as the cutting of the workpiece S held by the cutting-use holding member 51 is executed though not shown.

In contrast, if the set holding member is the reading-use holding member 71 (step S4: Yes), specification of the shading correction data based on the reference portion 75 is carried out in the subsequent step S6. This process will be elaborated in the description of the flowchart indicated in FIG. 12. Then, at step S7, the image of the workpiece S is read by the scanner 6. The shading correction of the read image is performed based on the latest shading correction data specified by step S6.

Figure 12:
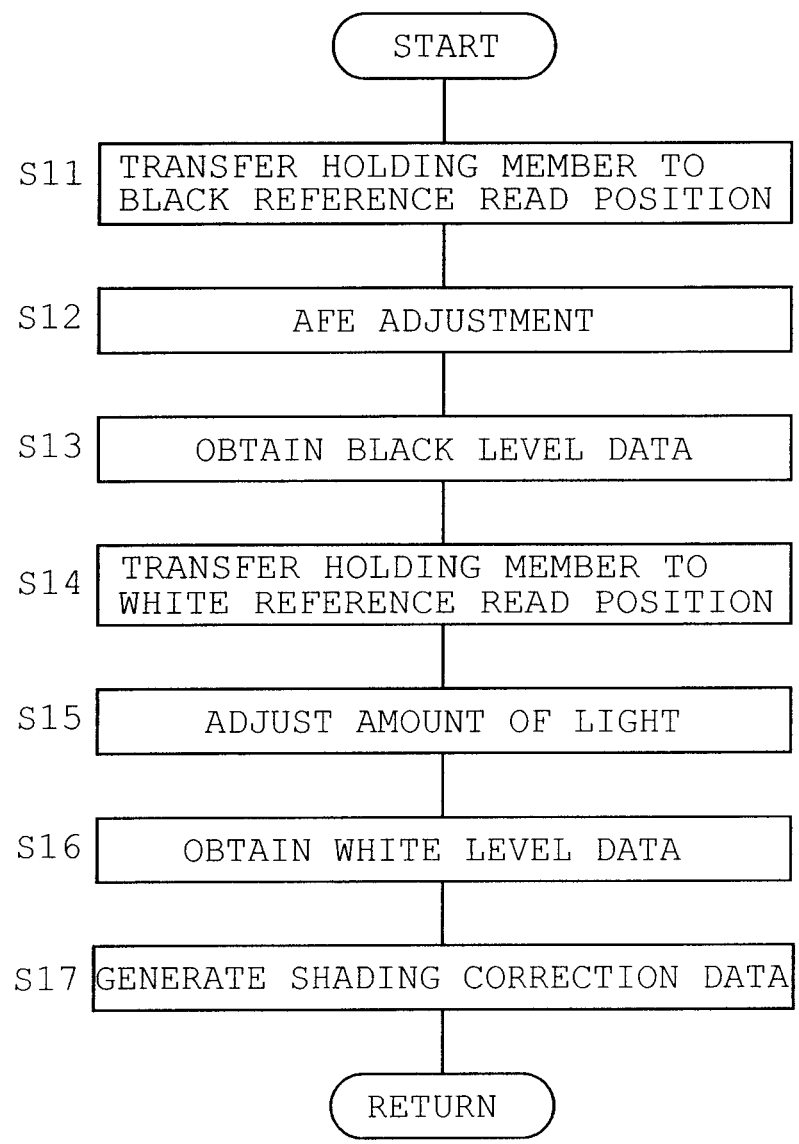
FIG. 12 is a flowchart indicating one example of a process flow for specifying a shading correction data.

Referring to FIG. 12, the specification of the shading correction data based on reference portion 75 will be described. The shading correction employs a known methodology and thus will be described briefly. At step S11, the reading-use holding member 71 is fed by the feed mechanism 7 to the location where the black reference portion 78 is read by the scanner 6. Then, at step S12, AFE (Analog Front End) adjustment is performed. At step S13, black reference portion 78 is read by the scanner 6 and the black level data is obtained based on the read image.

Then, at step S14, the reading-use holding member 71 is fed by the feed mechanism 7 to the location where the white reference portion 77 is read by the scanner 6. At step S15, adjustment is made on the amount of light of the light source. Then, at step S16, white reference portion 77 is read by the scanner 6 and the white level data is obtained based on the read image. Then, at step S17, the shading correction data is generated by the black level data and the white level data and stored.

Once the specification of the shading correction data is completed based on the image data obtained by reading reference portion 75, the process flow returns to the flowchart indicated in FIG. 11 to execute the reading of the workpiece S of step S7. Because the correction data is specified by reading the reference portion 75 of the reading-use holding member 71, shading correction of the image read by the scanner 6 based on the workpiece S can be carried out properly.

In the first embodiment, the cutting apparatus 1, in other words, the image processing apparatus 1' is provided with holding members for holding the workpiece S, namely, the cutting-use holding member 51 also referred to as the first holding member and the reading-use holding member 71 also referred to as the second holding member provided with the reference portion 75. Further, based on the result of reading the indicators 54 and 73 provided on the cutting-use holding member 51 and the reading-use holding member 71, the type of the cutting-use holding member 51 and the reading-use holding member 71 is identified automatically. If the type of the holding member is identified as the cutting-use holding member 51, shading correction is performed on the image read by the scanner 6 based on preset settings. If the type of the holding member is identified as the reading-use holding member 71, shading correction is performed on the image read by the scanner 6 based the image data obtained by reading the reference portion 75. The above described configuration provides an outstanding advantage in which proper shading correction can be executed on the image read by the scanner 6 depending upon the type of holding member 51/71 being used.

Further, scratches resulting from the repeated cutting gradually accumulate on the surface of the cutting-use holding member 51 and thus, the cutting-use holding member 51 is a consumable which is replaced by a new one after being used for approximately ten times. Because the reference portion 75 is not provided on the cutting-use holding member 51 in the first embodiment, the cutting-use holding member 51 can be manufactured in low cost. The reading-use holding member 71 on the other hand, may be used repeatedly over a long period of time.

The first embodiment is especially advantageous in that the reference portion 75 includes both the white reference portion 77 and the black reference portion 78 and thereby allowing shading correction to be executed even more properly. Further, the first embodiment arranges the upper surface of the reference portion 75 to be substantially level with the upper surface of the workpiece S placed on the holding portion 74. Thus, the distance between the scanner 6 and the reference portion 75 can be substantially equalized with the distance between scanner 6 and the workpiece S which allows precise specification of the correction data and thereby allowing the shading correction to be executed even more properly.

Still further, in the first embodiment, the holding portion 74 of the reading-use holding member 71 is configured to hold the workpiece S between the base 72 and the transparent sheet 76, whereas holding portion 53 of the cutting-use holding member 51 is configured to hold the workpiece S through the attachment to the second adhesive layer 53a. Because the manner of holding the workpiece differs depending upon the type of holding member 51/71, misuse on the part of the user can be prevented.

Figure 13A:
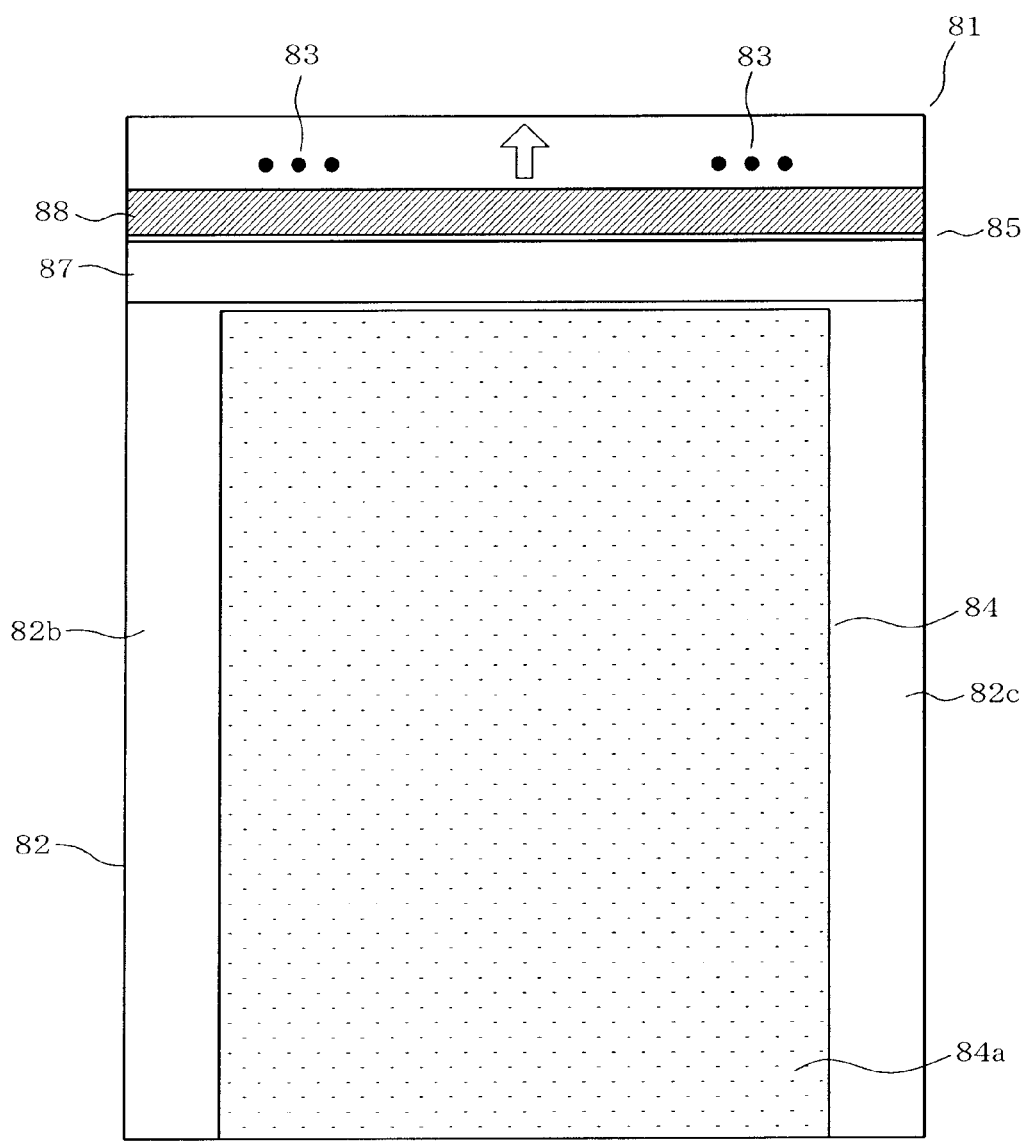
FIG. 13A pertains to a second embodiment and is one example of a plan view schematically illustrating the configuration of a reading-use holding member.
Figure 13B:
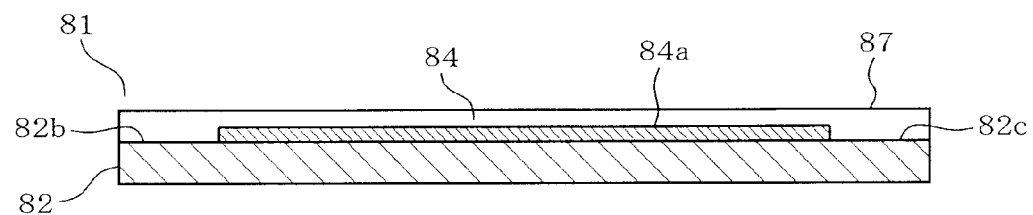
FIG. 13B is one example of a reading-use holding member.

FIGS. 13A and 13B pertains to a second embodiment of the disclosure and illustrates the configuration of a reading-use holding member 81 also referred to as a second holding member that holds the workpiece S. As shown in FIG. 13A, a reading-use holding member 81 is made of a soft synthetic resin material and includes a rectangular base 82 slightly elongated in the front and rear direction. In the forward region of the base 82, located on the leading end of the reading-use holding member 81 being fed into inlet 2*a*,an indicator 83, a reference portion 85 for shading correction, and a holding portion 84 are provided in the listed sequence. The holding portion 84 removably holds workpiece S not shown. The workpiece S comprises a sheet material such as paper having the original image depicted on it which is used for generating cut data. The indicator 83 comprises 3 black dots aligned in the left and right direction as was the case in the reading-use hording member 71. The reference portion 85 also includes both the white reference portion 87 and the black reference portion 88 as was the case in the first embodiment.

The holding portion 84 is provided with an adhesive layer in a rectangular region on the upper surface of the base 82 exclusive of the region for forming the indicator 83 and the reference portion 85, the left edge 82*b*,and the right edge 82*c*. This adhesive layer is referred to as a first adhesive layer 84*a* having a first adhesive force. In the first embodiment, the holding portion 53 of the cutting-use holding member 51 is provided with a second adhesive layer 53*a* having a second adhesive force which is relatively strong in order to hold the workpiece S unmovably during cutting. The workpiece S held by the reading-use holding member 81, however, is not subjected to any external force, in other words, the cutting force of the cutter 4, and thus, the first adhesive force of the first adhesive layer 84*a* may be weaker than the second adhesive force of the second adhesive layer 53*a*.

Further, as shown in FIG. 13B, the height of the upper surface of the reference portion 85, that is, the white reference portion 87 and the black reference portion 88 is configured at to be higher than the height of the upper surface of the placement 72*d* located on the base 72. The difference between the heights is configured to be substantially equal to the standard thickness of reading-use workpiece S being approximately 0.28 mm which envisages the thickness of a printed photograph. Stated differently, the upper surface the reference portion 85 is configured to be substantially level with the upper surface of workpiece S held by the holding portion 84.

The reading-use holding member 81 of the second embodiment provides the effects similar to those of the reading-use holding member 71 of the first embodiment.

In the foregoing embodiments, the cutting apparatus 1 was configured to include the image processing apparatus 1'. The present disclosure may, however, be applied to image reading apparatuses in general such as a copier, facsimile, and an image scanner.

In the foregoing embodiments, the reference portions 75 and 85 were configured by both the white reference portions 77 and 87 and the black reference portions 78 and 88. However, the provision of at least the white reference portion will allow the correction data for use in the shading correction to be obtained. Further, the white reference portions 77 and 87 and the black reference portions 78 and 88 each configured by an adhesive tape may be replaced by printed coating, or the like.

The provision of indicators in the holding member is not mandatory. In the absence of the indicators, the type of holding member may be identified by detecting the presence/absence of the reference portion by the scanner 6. If the holding member is not provided with the reference portion and is only provided with the holding portion, the scanner 6 may read the workpiece S held by the holding member and shading correction may be performed based on preset settings. If the holding member is provided with the reference portion, the scanner 6 may read the workpiece S held by the holding member as well as the reference portion and shading correction may be performed based on the image data of the reference portion read by the scanner 6. The above described configuration also allows shading correction of the read image depending upon the type of holding members being used.

Further, the indicators 54, 73, and 83 are not limited to black dots but may replaced by various characters, numerals, symbols, and graphics or the like, as long as the indicator allows identification of type by image reading. The identification of type may also be implemented by varying the color of the indicators.

Still further, the reading-use holding member 71 and 81 and the cutting-use holding member 51, as well as the base 72, 82, and 52 made of synthetic resin in the foregoing embodiments may be made of thick sheet of paper or metal plate. Three or more types of holding members including the first and the second holding members may be interchanged depending upon use.

The foregoing description and drawings are merely illustrative of the principles of the disclosure and are not to be construed in a limited sense. Various changes and modifications will become apparent to those of ordinary skill in the art. All such changes and modifications are seen to fall within the scope of the disclosure as defined by the appended claims.

What is claimed is:

1. An image reading apparatus, comprising:
   an image reading unit configured to read an image of a workpiece;
   a plurality of holding members each configured to hold the workpiece while image reading is performed by the image reading unit and each including an indicator identifying a type of holding member:
   an identification unit configured to identify the type of holding member based on a result of reading of the indicator by the image reading unit; and
   a correction unit configured to perform a shading correction of the image read by the image reading unit based on a result of identification by the identification unit,
   wherein the plurality of holding members include at least to first holding member and a second holding member, the first holding member including a holding portion configured to hold the workpiece, the second holding member including a holding portion configured to hold the workpiece and a reference portion configured for use in the shading correction, and
   wherein the correction unit, when the first holding member is identified by the identification unit, is configured to perform the shading correction based on a preset setting, and when the second holding member is identified by the identification unit, is configured to perform the shading correction based on the image data of the reference portion read by the image reading unit.

2. An image reading apparatus, comprising:
   an image reading unit configured to read an image of a workpiece;
   a plurality of holding members each configured to hold the workpiece while image reading is performed by the image reading unit, the plurality of holding members including at least a first holding member and a second holding member, the first holding member including a holding portion configured to hold the workpiece, the second holding member including a holding portion configured to hold the workpiece and a reference portion configured for use in the shading correction; and a correction unit configured to perform a shading correction of the image read by the image reading unit, the correction unit, when the image reading unit reads the workpiece held by the first holding member, being configured to perform the shading, correction based on a preset setting, and when the image reading unit reads the workpiece held by the second holding, member and the reference portion, being configured to perform the shading correction based on the image data of the reference portion read by the image reading unit.

3. A cutting apparatus, comprising:

an image reading unit configured to read an image of a workpiece;

a plurality of holding members each configured to hold the workpiece while image reading is performed by the image reading unit and each including an indicator identifying a type of holding member, the plurality of holding members including at least at first holding member and a second holding member, the first holding member including a holding portion configured to hold the workpiece, the second holding member including a holding portion configured to hold the workpiece and a reference portion configured for use in the shading correction, and an identification unit configured to identify the type of holding member based on a result of reading of the indicator by the image reading unit;

a correction unit configured to perform a shading correction of the image read by the image reading unit based on a result of identification by the identification unit, the correction unit, when the first holding member is identified by the identification unit, being configured to perform the shading correction based on a preset setting, and when the second holding member is identified by the identification unit, being configured to perform the shading correction based on the image data of the reference portion read by the image reading unit; and a cutting mechanism configured to cut the workpiece held by the holding portion of the first holding member.

4. A cutting apparatus, comprising:

an image reading unit configured to read an image of a workpiece;

a plurality of holding members each configured to hold the workpiece while image reading is performed by the image reading unit, the plurality of holding, members including at least a first holding member and a second holding member, the first holding member including a holding portion configured to hold the workpiece, the second holding, member including a holding portion configured to hold the workpiece and a reference portion configured for use in the shading correction;

a correction unit configured to perform a shading correction of the image read by the image reading unit, the correction unit, when the image reading unit reads the workpiece held by the first holding member, being configured to perform the shading correction based on a preset setting, and when the image reading unit reads the workpiece held by the second holding member and the reference portion, being configured to perform the shading correction based on the image data of the reference portion read by the image reading unit; and a cutting mechanism configured to cut the workpiece held by the holding portion of the first holding member.

* * * * *